United States Patent
Astbury et al.

(10) Patent No.: US 12,153,226 B2
(45) Date of Patent: Nov. 26, 2024

(54) LENS ASSEMBLY FOR SUPER-RESOLUTION MICROSCOPY

(71) Applicant: United Kingdom Research and Innovation, Swindon (GB)

(72) Inventors: Sam Astbury, Oxfordshire (GB); Martin Tolley, Oxfordshire (GB); Christopher Spindloe, Oxfordshire (GB)

(73) Assignee: United Kingdon Research and Innovation, Swindon (GB)

( * ) Notice: Subject to any disclaimer, the term of this patent is extended or adjusted under 35 U.S.C. 154(b) by 611 days.

(21) Appl. No.: 17/273,639

(22) PCT Filed: Sep. 6, 2019

(86) PCT No.: PCT/GB2019/052494
§ 371 (c)(1),
(2) Date: Mar. 4, 2021

(87) PCT Pub. No.: WO2020/053557
PCT Pub. Date: Mar. 19, 2020

(65) Prior Publication Data
US 2021/0341747 A1    Nov. 4, 2021

(30) Foreign Application Priority Data

Sep. 10, 2018  (GB) .................................. 1814646

(51) Int. Cl.
*G02B 21/00* (2006.01)
*G02B 7/02* (2021.01)
(Continued)

(52) U.S. Cl.
CPC ......... *G02B 27/58* (2013.01); *G02B 21/0088* (2013.01); *G02B 21/02* (2013.01)

(58) Field of Classification Search
CPC .. G02B 21/00; G02B 21/004; G02B 21/0016; G02B 21/02; G02B 21/24; G02B 21/26;
(Continued)

(56) References Cited

U.S. PATENT DOCUMENTS 5,125,750 A * 6/1992 Corle ...................... G01Q 80/00
                                                      359/356
6,307,689 B1 * 10/2001 Ichimura ................ B82Y 10/00
(Continued)

FOREIGN PATENT DOCUMENTS

CN    1875306 A    12/2006
CN    106796337 A    5/2017
(Continued)

OTHER PUBLICATIONS

Bo Huang et al., Science 319, 810 (2008), "Three-dimensional super-resolution imaging by stochastic optical reconstruction microscopy".
(Continued)

*Primary Examiner* — Thong Q Nguyen
(74) *Attorney, Agent, or Firm* — Lempia Summerfield Katz LLC

(57) ABSTRACT

A lens assembly, for use in microscopy imaging of a sample in a cryogenic environment, is described. A solid immersion lens which has a planar surface for accepting a sample for imaging is mounted within an aperture provided through the plane of a planar mount. The microscopy imaging may include using super-resolution optical imaging techniques such as single molecule localisation techniques.

25 Claims, 6 Drawing Sheets

(51) Int. Cl.
    *G02B 21/02*     (2006.01)
    *G02B 27/58*     (2006.01)

(58) Field of Classification Search
    CPC .......... G02B 27/00; G02B 27/58; G02B 7/00;
                  G02B 7/02; G02B 7/023; G02B 7/025;
                         G02B 7/026; G02B 7/027
    USPC ................. 359/368–389, 656–664, 808–830
    See application file for complete search history.

(56) References Cited

U.S. PATENT DOCUMENTS

| | | | |
|---|---|---|---|
| 6,404,710 B1 | 6/2002 | Ichimura et al. | |
| 7,551,540 B2 * | 6/2009 | Shinoda | G11B 7/1374 369/112.23 |
| 7,576,928 B2 * | 8/2009 | Tanabe | G02B 21/33 359/813 |
| 8,350,882 B2 * | 1/2013 | Hwang | G02B 7/025 359/819 |
| 2005/0190436 A1 | 9/2005 | Terada et al. | |
| 2005/0220266 A1 | 10/2005 | Hirsch | |
| 2006/0077788 A1 | 4/2006 | Shinoda | |
| 2006/0176548 A1 | 8/2006 | Terada et al. | |
| 2006/0182001 A1 | 8/2006 | Isobe et al. | |
| 2012/0113534 A1 | 5/2012 | Arata et al. | |
| 2015/0098131 A1 * | 4/2015 | Grejda | G03F 7/70825 359/558 |
| 2017/0235087 A1 * | 8/2017 | Terada | G02B 7/02 348/79 |

FOREIGN PATENT DOCUMENTS

| | | | |
|---|---|---|---|
| JP | H04166905 A | | 6/1992 |
| JP | H05113529 A | | 5/1993 |
| JP | 2000089004 A | | 3/2000 |
| JP | 2001 202649 | | 7/2001 |
| JP | 2003029157 A | | 1/2003 |
| JP | 2007-305259 | * | 11/2007 |
| JP | 2011164007 A | | 8/2011 |
| KR | 101696585 B1 | | 1/2017 |

OTHER PUBLICATIONS

Doory Kim et al., PLos One 10(4): e0124581, Apr. 2015, Correlative stochastic optical reconstruction microscopy and electron microscopy.

Brunner et al. (2004), "Diffraction-based solid immersion lens", Journal of the Optical Society of America, A 21(7):1186-1191.

Cohn et al. (2002), "Transient photoinduced diffractive solid immersion lens for infrared microscopy", Applied Physics Letters, 81(19):3678-3680.

Lin Wang et al., (2010), "Wide-field high-resolution solid immersion fluorescence microscopy applying an aplanatic solid immersion lens", Applied Optics, vol. 49, No. 31, 6160-6169.

Wang L. et al., "Solid Immersion Microscopy Readily and Inexpensively Enables 12 nm Resolution on Plunge-Frozen Cells", bioRxiv, Jul. 2018, https://doi.org/10.1101/373647.

PCT Application No. PCT/GB2019/052494, International Search Report and Written Opinion dated Nov. 8, 2019, 10 pages.

GB Application No. 1814646.4, Search Report, dated Mar. 6, 2019, one page.

Chinese Application No. 201980058754.3 Office Action dated Mar. 26, 2024.

* cited by examiner

LENS ASSEMBLY FOR SUPER-RESOLUTION MICROSCOPY

CROSS REFERENCE TO RELATED APPLICATIONS

This application is a national phase entry under 35 U.S.C. § 371 of PCT/GB2019/052494 filed on Sep. 6, 2019, which claims priority to GB Application No. 1814646.4 filed on Sep. 10, 2018. The contents of each of the aforementioned patent applications are hereby incorporated by reference in their entirety.

The present invention relates to a lens assembly for use in microscopy imaging of a sample located in a cryogenic environment, and methods of constructing and using such a lens assembly. For example, the microscopy imaging may include super-resolution optical imaging using techniques such as a single molecule localisation technique.

INTRODUCTION

The resolution of conventional microscopy is limited due to the diffraction of light, with the achievable spatial resolution being approximately determined by the Abbe diffraction limit. The achievable spatial resolution therefore depends on optical parameters such as the numerical aperture of the objective lens, and this can be increased in various ways such as by using liquid immersion techniques in which a fluid of high refractive index is used to optically couple the objective lens and the sample to be imaged.

Various additional techniques for overcoming the spatial resolution limits of optical imaging systems beyond changing the optical configuration have also been developed in the prior art, and may generally be referred to as techniques of super-resolution microscopy. Such techniques include, for example, single molecule localisation techniques in which optical emitters are isolated and their positions fitted using an approximate point spread function.

It is often desirable to carry out such super-resolution microscopy techniques at cryogenic temperatures, for example to enable accurate imaging of vitrified biological samples in their native state. The invention therefore addresses these and other aspects of the prior art.

SUMMARY OF THE INVENTION

It has been found that further improving the resolution of super-resolution microscopy techniques, such as single molecule localisation microscopy techniques, at cryogenic temperatures is made more difficult due to the difficulties of using wet immersion objective lenses, because the fluids used for wet immersion in normal microscopy are not suitable for such low temperatures. Aspects of the invention therefore support the use of solid immersion lenses in super-resolution microscopy at cryogenic temperatures. Advantageously, aplanatic solid immersion lenses may be used for this purpose to further enhance the resolution obtained using the chosen super-resolution microscopy technique, without the difficulties of using wet objective immersion fluids.

The use of solid immersion lenses for these purposes increases the numerical aperture and light collection efficiency of the objective-solid immersion lens system, thereby improving the available resolution of the microscopy technique.

Combining the single molecule localisation microscopy technique or other super-resolution optical microscopy techniques at cryogenic temperatures with solid immersion lenses in this way enables image resolutions of a few tens of nanometers to be achieved in cryogenic conditions, and therefore provides image resolutions suitable for combining with electron microscopy images of the same samples at similar resolutions in correlative imaging operations. Such correlative imaging between these two techniques may be particularly advantageous in imaging biological samples preserved in a near native state using vitrification techniques.

The invention therefore provides a lens assembly for use in microscopy imaging of a sample in a cryogenic environment, the lens assembly comprising: a mount comprising an aperture through the mount; and a solid immersion lens comprising a planar surface for accepting the sample for imaging, the solid immersion lens being mounted within the aperture. In particular, the mount may be described as a planar mount, and the aperture may then be through a plane, for example a principle plane of the mount. Of course, although the mount may be described as planar or generally planar, this does not exclude the possibility of one or more features such as elements used for handling or positioning extending out of such a plane.

In particular, the solid immersion lens may be an aplanatic solid immersion lens, ASIL, which has additional advantages in terms of optical performance as discussed below.

The planar surface of the lens may be parallel or substantially parallel to the plane of the mount, or to a planar surface of the mount to be used for positioning the lens assembly within one or more microscopes. In this way, the optical axis of the solid immersion lens is carefully controlled and predictable, for example even in the event of arbitrary axial rotation of the lens assembly within such a microscope, thereby improving performance of the microscopy and use of the solid immersion lens.

Typically, the solid immersion lens may extend from the aperture through the mount in both directions away from the plane of the mount. The solid immersion lens may then be secured at or close to a region of widest diameter, that is an equator or in an equatorial region of the lens, within the aperture.

The aperture may comprise a circumferential channel between the planar mount and the solid immersion lens, and the planar mount may then comprise a plurality of nibs or protrusions extending into the circumferential channel towards the solid immersion lens, so as to align, support, or control a position of the solid immersion lens. In particular, the nibs may assist in providing for an accurate location of the lens when located within the aperture, such that subsequent bonding between the lens and planar mount may be carried out maintaining this accurate location, for example despite fluid forces such as capillary actions tending to pull the lens away from the chosen position.

The nibs may, for example, extend across the circumferential channel to touch the solid immersion lens, or may be slightly shorter for example extending more than 90% across the channel.

To this end, at least three such nibs may be used to ensure that capillary forces are equal and therefore the lens is not preferentially pulled in any particular direction. The plurality of nibs may be evenly distributed, that is at substantially equal spacings from each other, around the circumferential channel to further ensure that the lens is not preferentially pulled in any particular direction.

The lens assembly may comprise adhesive material within the circumferential channel, the adhesive material bridging between the planar mount and the solid immersion lens. This adhesive material is preferably provided in addition to the nibs mentioned above, although applying the adhesive material in particular ways may be advantageous to further avoid unwanted misalignment of the lens and the mount which can still occur despite the positioning action of the nibs. In particular, the adhesive material may extend continuously around the circumferential channel in order to provide robust support for the lens within the mount. Such adhesive material may cover over the nibs.

The solid immersion lens may typically be spherical in shape, with the addition of the planar sample surface mentioned above. An equatorial cross section through the solid immersion lens may typically then be circular. Although other shapes and forms may be used, the aperture may similarly be circular, and optionally a periphery or circumference of the planar mount may also be circular. By providing the aperture to be substantially the same shape as a circumference of the lens to be held within the aperture helps in the even application of adhesive material around the full circumferential channel and further helps avoid misalignment of the lens occurring, for example due to fluid forces of the uncured adhesive as it is being applied, and due to strains which may occur during curing.

The mount may be formed of or may comprise at least one of: a metal, a ceramic, and a semiconductor. If a metal is used, this may be platinum or another biocompatible metal although other metals and materials may be used.

The invention also provides apparatus for using a lens assembly as described above, for example an apparatus for carrying out super-resolution optical microscopy on a sample, comprising: the lens assembly discussed above; a sample on or adjacent to the planar surface of the solid immersion lens; a cryogenic environment in which the sample is located; and a super-resolution optical microscope arranged to provide a super-resolution optical image of the sample, for example by obtaining the image through the solid immersion lens.

The invention also provides methods of manufacture or construction of the described lens assemblies, such as a method of mounting a solid immersion lens for use in microscopy imaging of a sample in a cryogenic environment, the solid immersion lens comprising a planar surface for accepting the sample for imaging, the method comprising: providing a mount, for example a generally planar mount, comprising an aperture through the mount; and mounting the solid immersion lens within the aperture such that a circumferential channel separates the solid immersion lens and the mount, and such that the solid immersion lens extends from the aperture in both directions away from the mount, or more particularly away from a principle plane of the mount.

As mentioned above, the aperture may comprise a plurality of nibs or protrusions, and the step of mounting may then comprise locating the solid immersion lens within the aperture and in contact with or proximal to the tip of each of the nibs, such that each nib extends into the circumferential channel towards a proximal portion of the solid immersion lens, and optionally across, or substantially across the circumferential channel to touch or nearly touch the solid immersion lens.

The step of mounting may comprise a subsequent step of securing the solid immersion lens within the aperture using adhesive material. However, such adhesive material in liquid form may impart substantial fluid and curing forces on the lens leading to unwanted misalignment of the lens despite accurate positioning using the nibs.

The step of securing may therefore comprise a step of placing first adhesive material at, on, or around each of the nibs to secure the solid immersion lens to the mount at the nibs. The first adhesive material may then be allowed to cure before further steps are taken.

The step of securing may optionally then also comprise a subsequent step of placing second adhesive material at, on or around each of the nibs to further secure the solid immersion lens to the planar mount at the nibs and allowing the second adhesive material to cure. In this case, the first adhesive material may have a shorter curing time than the second adhesive material, since the lens is already at least partly secured using the first adhesive so is less likely to move, and a longer curing time may provide a more secure bond using the second adhesive.

Whether or not the second adhesive material is used as mentioned above, the step of securing may comprise a subsequent step of placing third adhesive material around the circumferential channel, for example along the full length of the channel around the lens or at least around 90% of the channel, and allowing the third adhesive to cure. In particular, a cryo compatible adhesive may be used for this purpose.

In order to provide a suitable retaining mechanism for presenting the solid immersion lens and planar mount for adhesive application as discussed above, methods may further comprise: providing a jig or platform having a first channel or groove formed in an upper surface of the jig, and a second channel or groove formed in a floor of the first channel. The first and second channels may be linear and parallel. The planar mount is then located or placed into the first channel, a floor of which supports the planar mount, and the solid immersion lens is placed in the second channel, which has a depth and position within the first channel such that the solid immersion lens is located within the aperture through the plane of the mount, for example such that an equatorial region of the solid immersion lens is located within the aperture. The solid immersion lens may be oriented such that the planar surface of the lens is seated on the floor of the second channel. By providing the floors of the first and second channels to be parallel planes, this can be used to ensure that the solid immersion lens and planar mount are also parallel in advance of bonding using adhesive material.

The invention also provides methods of using the described lens assembly, for example a method of carrying out super-resolution optical microscopy on a sample, comprising: providing a lens assembly as described above; locating the sample on or adjacent to the planar surface of the solid immersion lens; locating the sample in a cryogenic environment; and imaging the sample through the solid immersion lens using a super-resolution optical microscopy technique to provide a super-resolution image of the sample.

For example, the super-resolution optical microscopy technique may be a single molecule localisation optical microscopy technique.

The invention also provides methods of correlative imaging, for example comprising the steps of: carrying out the above method of super-resolution optical microscopy to provide a super-resolution optical image of the sample; carrying out electron microscopy or X-ray microscopy on the sample to provide a further image of the sample; and correlating the super-resolution optical image and the further image of each sample to provide a correlative image of the sample.

When a cryogenic environment is mentioned in this document, such an environment may provide at least one of:

a temperature of less than 200 Kelvin; a temperature of less than 133 Kelvin; a temperature of less than 100 Kelvin; a temperature of less than 77 Kelvin, and/or be maintained using liquid nitrogen or using nitrogen vapour.

BRIEF DESCRIPTION OF THE DRAWINGS

Embodiments of the invention will now be described, by way of example only, with reference to the accompanying drawings of which.

DETAILED DESCRIPTION OF EMBODIMENTS

Figure 1:
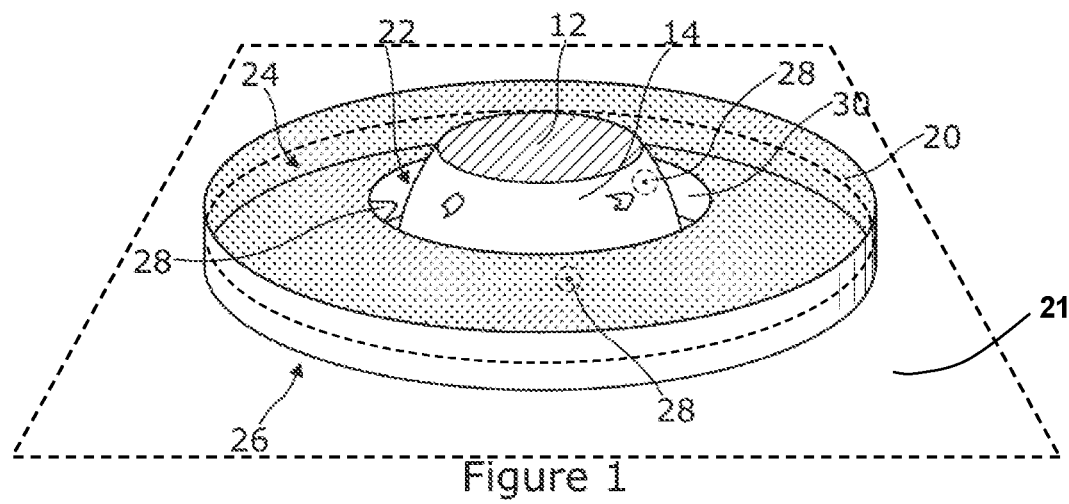
FIGS. 1 and 2 illustrate in perspective and plan views a lens assembly embodying the invention, omitting for clarity adhesive material typically also used.
Figure 2:
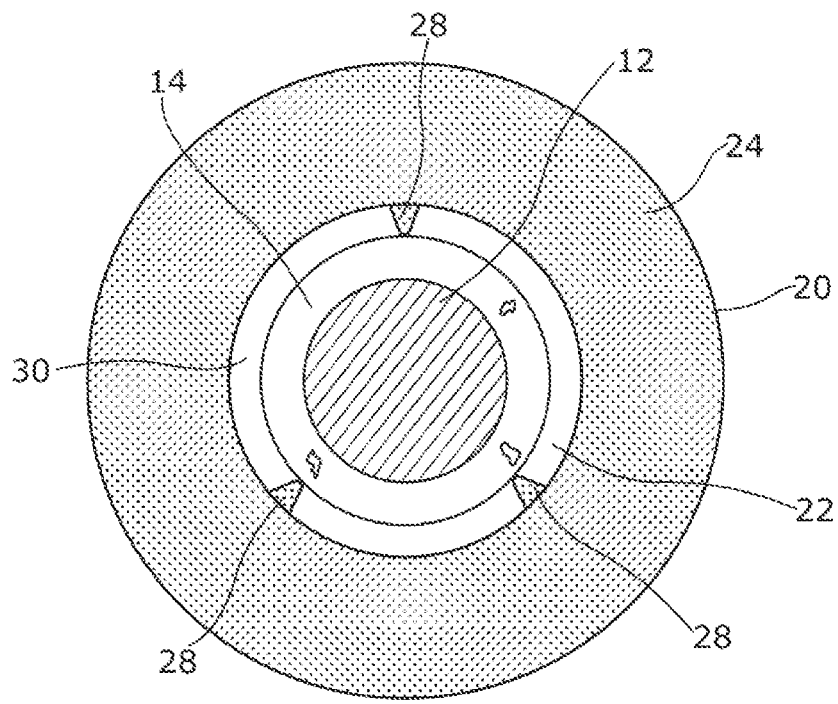
Figure 3:
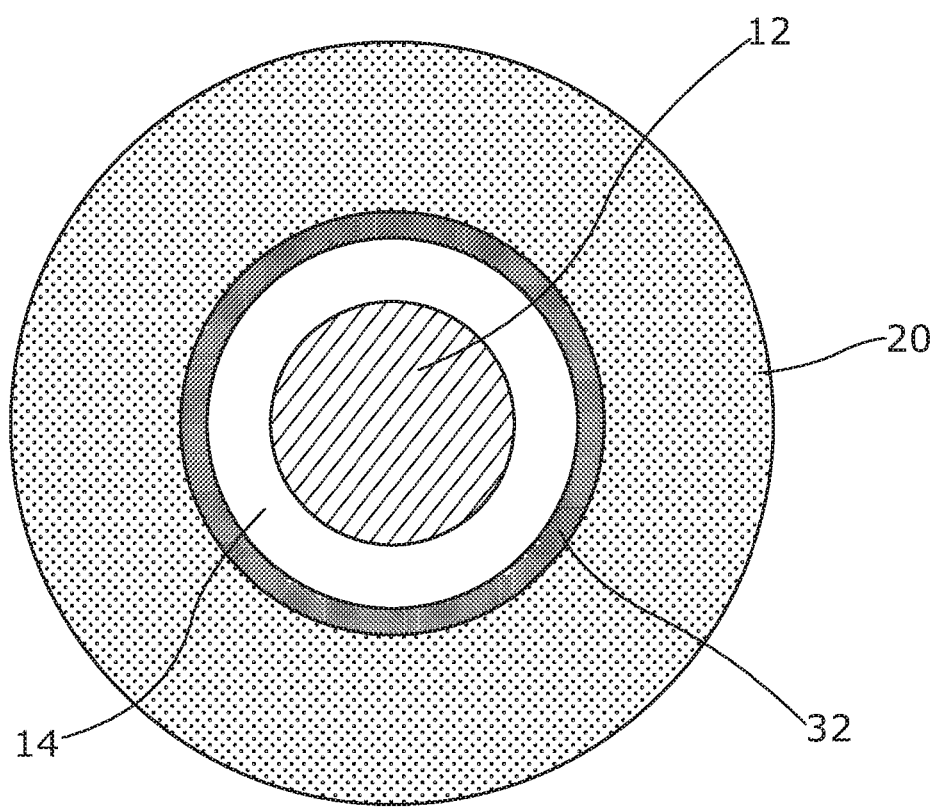
FIG. 3 corresponds to FIG. 2 but with the adhesive material also shown.

Referring now to FIG. 1 there is illustrated in perspective view a lens assembly 10 for carrying out microscopy, for example super-resolution optical microscopy, on a sample in a cryogenic environment. A corresponding plan view is shown in FIG. 2, and FIG. 3 shows a corresponding plan view with adhesive material described below also in place. The adhesive material typically used in these arrangements is omitted from FIGS. 1 and 2 for the purposes of clarity.

A sample for imaging or other analysis using microscopy (which is not shown in these figures) may be located adjacent to or in contact with a planar surface 12 of a solid immersion lens 14. In particular, and as illustrated in FIG. 1, this may be provided as an aplanatic solid immersion lens (ASIL) which takes the form of a truncated spherical ball lens discussed in more detail below. The lens assembly also comprises a planar mount 20 having opposing, and typically parallel, principal faces 24, 26, shown as upper and lower faces respectively in FIG. 1, but noting that the lens assembly may be used in any chosen orientation. The planar mount 20 and the principal faces extend in a principal plane 21 of the planar mount. The planar mount is provided with an aperture 22 through the plane of the mount 20, and the solid immersion lens is mounted or secured within the aperture.

As illustrated in FIG. 1 the solid immersion lens 14 may extend from the aperture 22 in both directions away from the principal plane of the mount, illustrated in FIG. 1 as upwards and downwards from the plane of the mount. In particular, the solid immersion lens 14 may be mounted such that an equatorial region of the solid immersion lens is secured within the aperture.

The solid immersion lens 14 may be mounted within the aperture such that the planar surface 12 of the solid immersion lens is parallel or substantially parallel to the principal plane of the mount, for example being substantially parallel to one or both opposing principal faces 24, 26 of the planar mount. Substantially parallel may be, for example within about 1 degree or within about 0.1 degrees from parallel with either or both of the opposing faces 24, 26 and/or the principal plane. This allows a user to have a high degree of confidence in the orientation of the planar surface 12 when the lens assembly is installed within suitable microscope equipment.

The periphery of the planar mount 20 illustrated in FIG. 1 is circular in plan, and the aperture 22 is also circular and positioned in the centre of the planar mount. However, other shapes for the periphery of the planar mount and other shapes and positions for the aperture may be used, for example such shapes may be square, rectangular, in the form of other polygons, irregular, and so forth as desired. The mount may typically be formed of a single material such as a metal, a ceramic or a semiconductor, but two or more different materials may be used for example in layers, coatings, or to add functional features. If biological samples are to be used with the lens assembly then a biocompatible material such as platinum may be preferred for the material of the planar mount. It may also be preferable to use a material for the mount which has a thermal expansion coefficient which is close to that of the material of the solid immersion lens and optionally also close to that of the adhesive used to bond the lens to the mount, especially the third adhesive described below.

The planar mount illustrated in the figures may be augmented if desired by other features and structures within or extending out of the principle plane of the planar mount, such as structures to assist with handling, mounting or calibrating the position of the lens assembly and the mounted solid immersion lens, or with laser machining or orientation.

The solid immersion lens is supported within the aperture by a plurality of nibs 28 or spikes which extend from a periphery of the aperture 22 into a circumferential channel 30 which extends around the circumference of the solid immersion lens 14 between the lens and the planar mount. In FIGS. 1 and 2 three such nibs are provided, but more than three may be used, for example four, five or six. The nibs are preferably disposed so as to nearly touch the circumference of the solid immersion lens when it is placed within the aperture in the chosen position (for example touching at an equatorial region of the lens), for example extending at least 90% of the distance across the circumferential channel, but the nibs may be formed to be slightly longer so as to actually touch or even so as to deform when the lens is placed within the aperture.

The nibs may typically be formed to be conical or pointed, although other shapes and forms may be used, and typically may each extend at their bases only a small fraction of distance around the periphery of the aperture, for example no more than 5% of the periphery for each nib 28.

Although the nibs 28 can be used to align and position the solid immersion lens 14 within the aperture 22, they are not intended to retain the lens in place during handling and use of the completed lens assembly. Therefore, adhesive material 32 as shown in FIG. 3 is also provided within the circumferential channel 30 so as to better secure the lens in place by bridging between the periphery of the aperture in the planar mount and the solid immersion lens. The adhesive material 32 may extend continuously in this way around the circumference of the channel, may cover the nibs, and may also substantially fill the depth of the channel, and optionally may completely fill and even extend out of the channel if desired. As discussed in more detail below, the adhesive material may be provided as two or more different adhesive materials applied at different stages of the manufacturing process, for example with a first adhesive material being first applied in the vicinity of the nibs 28, and at least a third adhesive material being subsequently applied around the circumferential channel 30.

Some typical dimensions of the lens assembly illustrated in the figures may be a diameter of the planar mount to be in the region of about 2-6 mm, the diameter of the solid immersion lens to be around 0.5 to 3 mm, and the thickness of the planar mount to be about 0.1 to 0.4 mm. The extension length of each of the nibs from the periphery of the aperture towards or to the solid immersion lens and therefore also the approximate width of the circumferential channel 30 may for example be about 5 to 20 µm.

It may be advantageous to construct the lens assembly so that the outside dimensions and shape of the lens assembly overall correspond to those of typical electron microscope grids, which are often supplied in circular and planar form having a diameter of about 3 mm, although other diameters are also frequently used. In this way, a particular lens assembly 10 with an associated sample located at the planar surface 12 of the solid immersion lens 14 may more easily be used in both operations of optical microscopy and electron microscopy, for example in a process of correlative imaging between these two techniques, for example where a super resolution microscopy technique is used.

Figure 4:
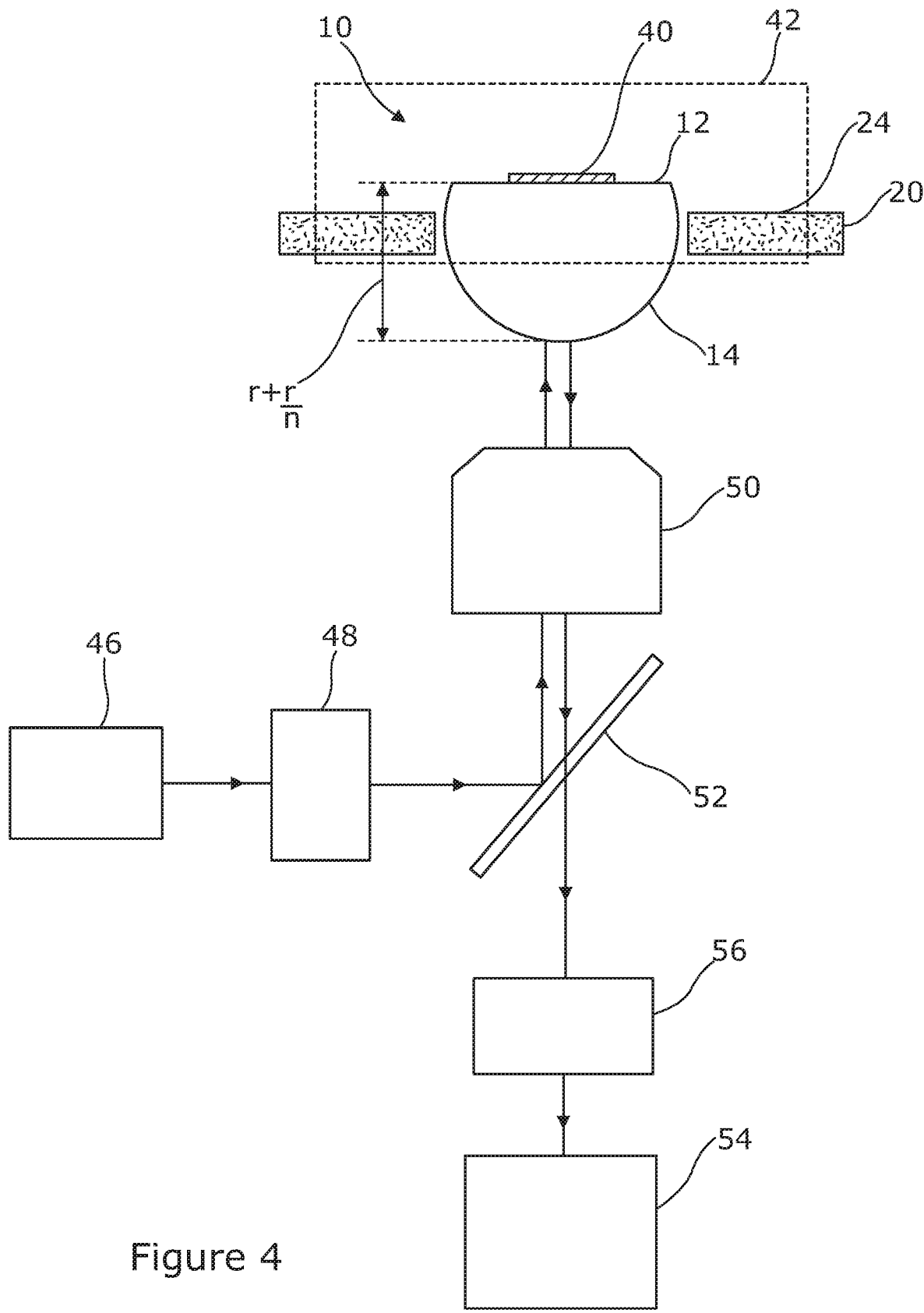
FIG. 4 provides a schematic illustration of apparatus for carrying out super-resolution microscopy on a sample located in a cryogenic environment using the lens assembly of FIGS. 1 to 3.

FIG. 4 illustrates apparatus for carrying out optical microscopy, and more particularly super-resolution optical microscopy on a sample 40 in a cryogenic environment 42. The lens assembly 10 is shown here in cross section. As discussed above, a sample 40 is located adjacent to or in contact with the planar surface 12 of the solid immersion lens 14 of the lens assembly 10.

One or more light sources 46 are used to form probe light which is typically conditioned or controlled using probe light optics 48 before being passed to an objective lens 50, for example by way of a beam splitter 52. The objective lens 50 is directed at the solid immersion lens 14 so as to deliver the probe light to the sample, and so as to collect image light from the sample for passing to one or more imaging elements 54 such as a CCD or CMOS camera. The path of the image light from the sample 40 through the solid immersion lens 14 to the one or more imaging elements 54 may be by way of beam splitter 52 and image light optics 56.

At least the sample 40 is contained within the cryogenic environment 42, but some or all of the solid immersion lens 14 and lens assembly 10 may also conveniently be contained within the cryogenic environment. The cryogenic environment may be such that the sample is at a temperature of less than 200 Kelvin, less than 133 Kelvin, less than 100 Kelvin, or less than 77 Kelvin, or alternatively may be defined by being maintained using liquid nitrogen or nitrogen vapour, or another cryogen, for example such a cryogen proximal to or in contact with the sample 40 and/or the solid immersion lens 14.

The sample 40 may be, for example, a thin sample or film of or containing biological or other material, such as one or more cells, organelles, membranes or the like. Alternatively, the sample may be provided by a surface region of a thicker sample element such as an element formed of a biological material, or formed of a non-biological material such as a block of an inorganic material to be studied, for example comprising quantum dots. The sample may be in contact with the solid immersion lens 14 as illustrated in FIG. 4, or may be displaced slightly from the surface of the lens, although typically by less than about 100 nm.

The arrangement of FIG. 4 is used to carry out super-resolution microscopy on the sample 40 in the cryogenic environment 42. The super-resolution microscopy is used to achieve an image resolution of the sample which exceeds the diffraction limit of the optical arrangement used. In the arrangement of FIG. 4, for example, the super-resolution microscopy is used to exceed the diffraction limit of the arrangement including the objective lens 50 and the solid immersion lens 14.

A variety of different super-resolution microscopy techniques may be used, but the technique may typically be a single molecule localisation technique. Typically in such a technique, the imaging element 54 is used to sequentially image the sample 40 multiple times, with only a small, and different, subset of the molecules in the sample being represented in each image. In this way, individual molecules, seen as single spots, can be separately identified in each image and therefore located to better positional accuracy than the diffraction limit of the optical arrangement, for example by fitting a curve of the expected point spread function to the detected image of each molecule, and then locating the corresponding centroids. By repeating the process for a plurality of such images, an image of the sample with much higher resolution can be constructed. There are only a few types of molecules, for example quantum dots, organic dyes and fluorescent proteins, in nature that can be imaged in a time-resolved manner in their native states. The majority of the samples need extra steps to be labelled with fluorescent emitters giving fluctuating intensity upon illumination.

In some such techniques, individual molecules of the sample may be labelled with optical emitters, for example fluorescent emitters, and the probe light used or controlled in such a way as to cause intermittent fluorescence events by those emitters, such that only a small subset of the emitters are emitting in each image. In some particular embodiments, the super-resolution microscopy technique may be a stochastic optical reconstruction microscopy technique, often referred to as STORM. Some particular implementations of such STORM techniques suitable for use with the invention as described in Bo Huang et al., Science 319, 810 (2008), "Three-dimensional super-resolution imaging by stochastic optical reconstruction microscopy", and Doory Kim et al., PLos ONE 10(4): e0124581, April 2015, "Correlative stochastic optical reconstruction microscopy and electron microscopy".

In preparing samples for such fluorescence imaging techniques, sample staining and labelling maybe carried out in much the same way as for other fluorescence imaging techniques. Many Alexa Fluor and Atto dyes can be used for STORM imaging, for example Alexa Fluor 647. Apart from organic dyes, many fluorescent proteins, such as mEOS and PAmCherry are also suitable.

However, the invention may be used with various other super-resolution microscopy techniques to improve image resolution where locating the sample in a cryogenic environment is desirable, for example structured illumination microscopy (SIM) and stimulated emissions depletion (STED) microscopy.

The solid immersion lens 14 mounted within the planar mount may more particularly be an aplanatic solid immersion lens (ASIL). Such an ASIL may be characterised by being substantially a truncated spherical ball lens of thickness r+r/n (as labelled in FIG. 4) where r is the ball radius and n is the refractive index of the material of the ball lens. This differs from a hemispheric solid immersion lens in the position of the substantially planar truncation surface which in the hemispheric case provides a lens thickness of r. A hemispheric solid immersion lens substantially in contact with a sample can be used to provide a numerical aperture, in combination with an objective 50, which has a multiple n of the numerical aperture of the objective 50 alone. In contrast, an aplanatic solid immersion lens in combination with an objective 50 can achieve a numerical aperture which has a multiple $n^2$ of the numerical aperture of the objective 50 alone, up to a maximum value of n.

Of course, the solid immersion lens only need be defined by the surfaces which are optically used in the respective optical arrangement, so that although the curved surface distal from the sample to be imaged is typically substantially spherical, and the surface proximal to the sample to be imaged is typically substantially planar, other portions of the aplanatic solid immersion lens do not necessarily need to complete the ball shape or ideal truncated sphere illustrated in FIG. 1.

Moreover, although the SIL or ASIL may be implemented using a curved surface which is spherical, non-spherical surfaces may be used, for example see Brunner et al. (2004), "Diffraction-based solid immersion lens", Journal of the Optical Society of America, A 2(7):1186-1191, and Cohn et al. (2002), "Transient photoinduced diffractive solid immersion lens for infrared microscopy", Applied Physics Letters, 81(19):3678-3680.

An aplanatic solid immersion lens can also provide a larger effective field of view than a hemispheric solid immersion lens, although there may be some increase in chromatic aberration which can be compensated by slight variations in the spacing between the objective 50 and the ASIL 14 for different wavelengths of light. Such aberration and design considerations are discussed for example in Lin Wang et al., Applied Optics, Vol. 49, No. 31, 6160-6169.

The increase in numerical aperture resulting from the use of the solid immersion lens or ASIL in the arrangement of FIG. 4 is directly dependent on the refractive index of the material used in the lens. A material of high refractive index, such as zirconium dioxide with a refractive index of 2.2 may therefore be used. The size of the lens may be selected so as to compromise between factors such as field of view and aberration effects. If an ASIL with a spherical diameter of about 3 mm is be used and the material is zirconium dioxide then this leads to a lens depth of about 2.18 mm.

Use of a solid immersion lens 14, or more particularly an ASIL, for carrying out super-resolution microscopy on a sample 40 in a cryogenic environment 42, as illustrated in FIG. 4, enables a higher numerical aperture to be achieved in the optical imaging arrangement, and therefore a higher precision in the super-resolution localisation of features detected by the imaging elements 54. An alternative way of achieving a higher numerical aperture would be to use a wet objective lens with a body of a high index immersion fluid body making contact with, and bridging the optical space between, the wet objective lens and the sample. However, such high index immersion fluids are not tolerant of the low temperatures associated with cryogenic environments which are often required by the nature of the sample to be studied, for example where the target structure in the sample to be imaged is an intracellular organelle or other biological structure which requires vitrification for the super-resolution imaging process to be successful. The present invention using a solid immersion lens therefore provides both a higher numerical aperture than that available using a wet immersion lens, and tolerance of cryogenic temperatures, in carrying out super-resolution microscopy. In contrast, typical microscope immersion oils are standardised for about 23° Celsius as specified by DIN/ISO. Some immersion oils for special applications can be obtained for use at 18°, 20° or 37° Celsius.

The dry objective lens 50 should have a working distance that is long enough to accommodate the solid immersion lens 14. For a typical working arrangement, a suitable lens could be a 50× Mitutoyo Plan Apo Infinity Corrected Long WD Objective (NA 0.55, working distance 13 mm).

According to the Rayleigh Criterion, the optical resolution of the combination of the objective lens 50 and an aplanatic solid immersion lens is:

$$d=0.61\lambda/(n^2 NA)$$

Here $\lambda$ is the wavelength of the collected image light, n is the refractive index of the ASIL material, and NA is the numerical aperture of the dry objective lens. Note the product of $n^2$ and NA is subject to a maximum value of n.

The resolution performance of a super-resolution technique based on detecting separate molecules in an image can then be evaluated using the localisation precision:

$$\sigma=d/\sqrt{N}$$

Here N is the photon number collected from each single molecule. Therefore, the localisation precision of such a super-resolution technique may be represented as:

$$\sigma=0.61\lambda/(n^2 NA\sqrt{A})$$

As an example, given a light wavelength of 500 nm and a conservative photon number of 1000, the localisation precision of a typical working arrangement would be 15 nm.

A solid immersion lens or ASIL for use in lens assemblies of the present invention may be obtained commercially, for example from Knight Optics (https://www.knightoptical.com) or from AWI (http://www.awi-industries.com). The planar mount may conveniently be formed by laser cutting, or other processes such as micromachining, photo-etching or photo-lithography from a sheet of suitable material such as a sheet of platinum metal, this cutting process including formation of the nibs 28.

The lens assembly 10 discussed above may then be constructed or assembled by aligning the solid immersion lens 14 with the planar mount 20 in the required position, for example using the jig arrangement illustrated in FIG. 5, and then carrying out a bonding process in multiple stages as discussed below and illustrated in FIG. 6.

Figure 5:
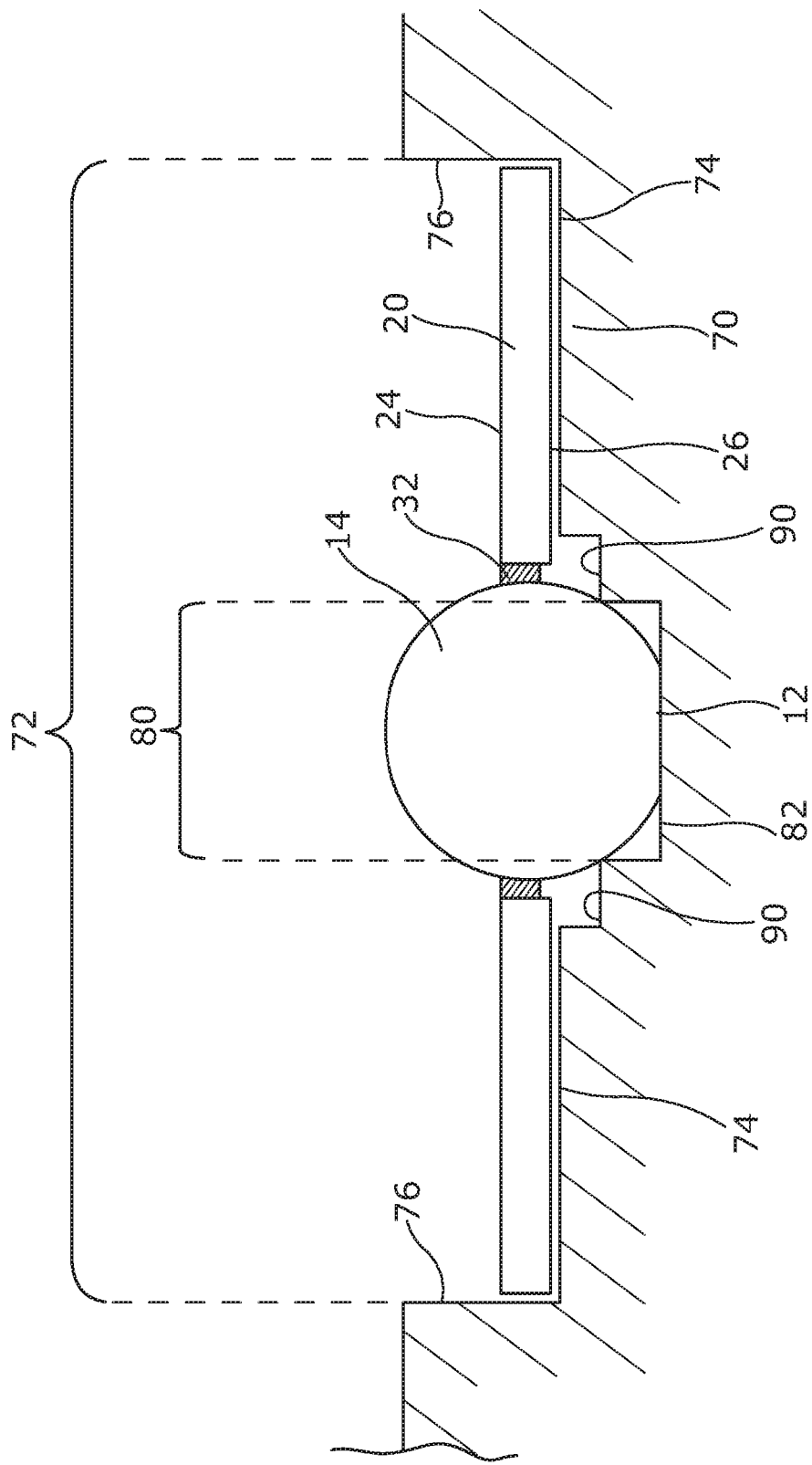
FIG. 5 illustrates alignment of components of the lens assembly using a jig.

FIG. 5 shows how the planar mount 20 and the solid immersion lens 14 may be aligned using a jig 70 shown here in cross section. The jig 70 includes a first groove 72 having a floor 74 which is preferably flat and having a width sufficient to accept the planar mount 20 within the first groove 72. For example, the first groove may be just slightly wider than the planar mount, and side walls 76 of the first groove 72 may be parallel in a direction along the length of the groove (into/out of the plane of the figure).

The jig 70 also provides a second groove 80, located preferably centrally in the floor 74 of the first groove, and providing a deeper floor 82 which is also preferably flat and having a width sufficient to accept the solid immersion lens, for example with the planar surface 12 of the solid immersion lens resting on the floor 82. The second groove may be just slightly wider than the solid immersion lens at the top of the second groove to provide a close fit.

The depths of the first and second grooves are configured such that the solid immersion lens 12 when sitting in the second groove, and the planar mount when sitting in the first groove, are accurately located relative to each other in the desired positions and orientations. In particular, the plane of the floor 74 of the first groove 72 and the plane of the floor 82 of the second groove may be parallel or substantially parallel (for example to a tolerance of better than 1 degree, or better than 0.1 degrees) in order to ensure that when completed the planar surface of the solid immersion lens is parallel to the principle plane of the planar mount, or to at least one of the lower and upper surfaces 24, 26 of the planar mount.

The position of the solid immersion lens in terms of which part of the lens is in contact with or very close to the nibs 28 can also be set by providing a suitable depth of the second groove 80. For example, an equator or widest circumference of the solid immersion lens may be touched by the nibs, and located adjacent to the planar mount, and this may provide the most secure position for fixing the lens and mount together, although other positions are possible if required. When the lens and the mount are correctly located, each nib 28 should extend across the circumferential channel 30 between the mount and the lens such that the lens is in contact or very nearly in contact with each of the nibs.

By making the side walls of all of the first and second grooves parallel, extending these grooves to open at an end of the jig, and optionally extending to be open at both of opposite ends of the jig, a user carrying out the alignment process can more easily see along the grooves to the planar mount and solid immersion lens to check the correct alignment before and during further bonding operations discussed below, either by eye or using a suitable optical device. For example, the spherical surface of the lens makes it difficult to see from above whether the lens is lying flat in the second groove, and a line of sight along the base of the second groove can be used to check this, and the lateral view from an end of the jig can also be used to ensure that the mount is lying flat in the first groove and that the lens is correctly positioned within the mount.

Similarly, such checks could be made automatically using a machine vision system which could also be used from above the jig to check positioning of the lens and mount.

Further rebates 90 at the boundaries between the first and second grooves may also be provided, such that the circumferential channel between the lens and the mount is located above these rebates 90 and not directly above the floor of the first groove. These rebates then reduce the likelihood of adhesive material placed into the circumferential channel from also bonding to the jig 70.

Having provided an accurate relative positioning of the planar mount 20 and the solid immersion lens 14, for example using the jig of FIG. 5 or similar, the solid immersion lens is held in a suitably central position within the aperture 22 of the planar mount by the nibs 28 (not shown in FIG. 5). The lens may then be fixed more securely in place using one or more adhesive materials, for example using a method as described below and as illustrated in the flow diagram of FIG. 6. The adhesive materials may typically be applied through a suitably small nozzle or using a spatula or other carrier such as a thin hair or eyelash, either by hand or machine, and optionally guided by a visual aid such as a stereo microscope.

Figure 6:
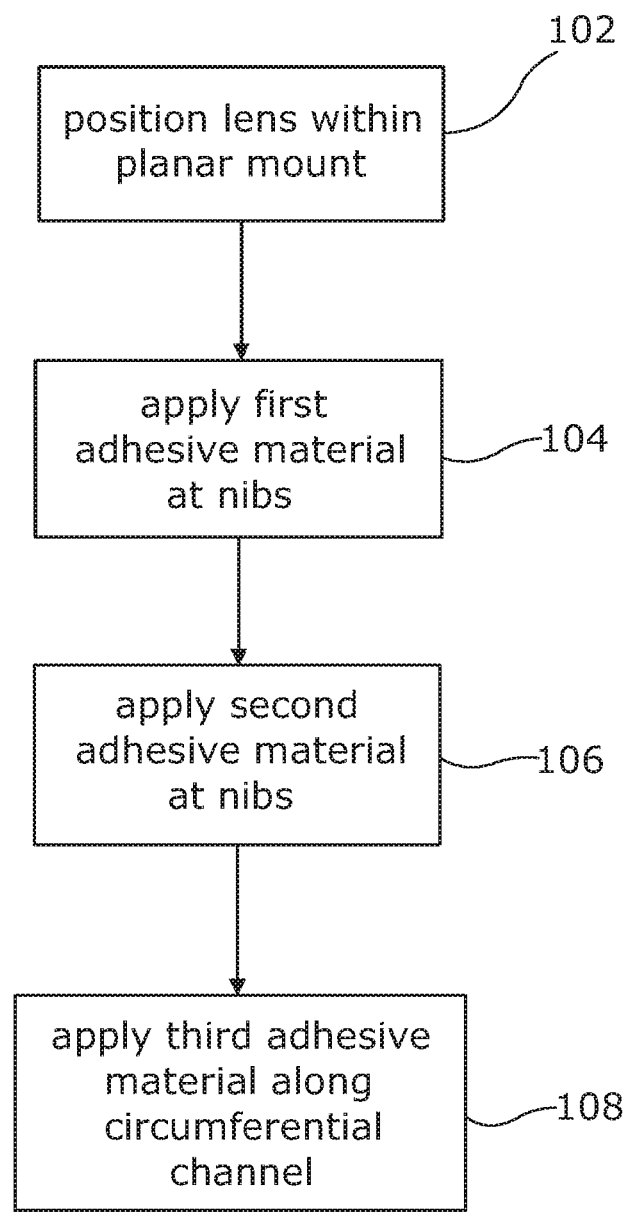
FIG. 6 provides a flow chart of a method for constructing the lens assembly involving the application of adhesive material.

As set out in FIG. 6, a first step 102 consists of locating the solid immersion lens 14 and the planar mount 20 relative to each other accurately in a desired position and orientation. A first adhesive material is then applied in step 104 at each of the nibs so as to bond between the periphery of the aperture and the lens adjacent to the nibs, and allowed to dry or cure so as to provide an initial bonding of the lens to the planar mount in these regions. Because the solid immersion lens is small it can easily be pulled away from the desired position within the aperture 22 by surface tension and other fluid effects of the first adhesive. Applying the first adhesive material in relatively small amounts only in the vicinity of the nibs minimises this effect, so that when the first adhesive material has cured sufficiently, the lens is fixed in position sufficiently securely to allow further adhesive material to be applied without risk of the lens being pulled out of position by the further adhesive material. For example, the volume of first adhesive material applied in the second step of FIG. 6 may be less than 20%, or less than 10% of the volume of further adhesive material applied in subsequent steps.

It is also desirable to use similar amounts of the first adhesive material at each nib, so as to provide a balance or equilibrium of forces between the pulling effect of the adhesive on the lens at each nib, for example due to adhesion and/or surface tension forces.

When the first adhesive material has cured sufficiently, further adhesive material may be applied in one or more further steps as shown in FIG. 6. In some cases a step 106 of applying a second adhesive material also only in the vicinity of the nibs may be carried out. In such as case, the first adhesive may be a faster curing adhesive than the second adhesive, for example less than about five minutes for the first adhesive, and around a few hours for the second adhesive.

Following the application of adhesive material in the vicinity of the nibs for example in step 104 and optionally in step 106, a third adhesive material is applied along most or all of the length of the circumferential channel 30 between the planar mount and the solid immersion lens in step 108 of FIG. 6. Since any gaps may cause issues in thermal contraction during cooling processes during use and provide a potential failure site of the bonding, applying the adhesive so as to be continuous and gap free along the circumferential channel may be desirable. For example this third adhesive material may be applied in sufficient volume to fill the channel.

This third adhesive material is preferably a cryogenically compatible glue particularly chosen for thermal stability when used in cryogenic conditions. Such cryogenically compatible glues include Stycast thermally conductive epoxy encapsulants available from Henkel AG under the Loctite brand (for example see http://www.loctite.co.uk). One such suitable produce is Stycast 2850 FT used with a Catalyst 23LV curing agent, for example available from Lakeshore Cryotronics Inc.

Typically, the adhesive material for applying around the full circumference of the channel 30 may have be a slower curing adhesive than the first or second adhesive materials, for example being heat cured for a number of hours at an elevated temperature.

The first and second adhesive materials mentioned above may also be cryogenically compatible glues such as suitable epoxy encapsulants, if desired, although the need for cryogenic compatibility may be lower for these materials. If desired, the same adhesive material may be used for two or more of the bonding stages as discussed above or as illustrated in FIG. 6.

Using these described methods for securing the solid immersion lens within the planar mount, including use of the nib structures discussed above, enable the lens to be fixed more accurately with reduced risk of undesirable offsets from the intended position occurring during application of adhesive material.

The invention may be used to implement correlative imaging of a sample in which image data acquired using the cryogenic super-resolution microscopy technique discussed above and illustrated in FIG. 4 is combined or correlated with image data acquired using electron microscopy and/or X-ray microscopy also carried out with the sample or samples located in a cryogenic environment. To this end, FIG. 7 is a flow chart illustrating a method of correlative imaging.

Figure 7:
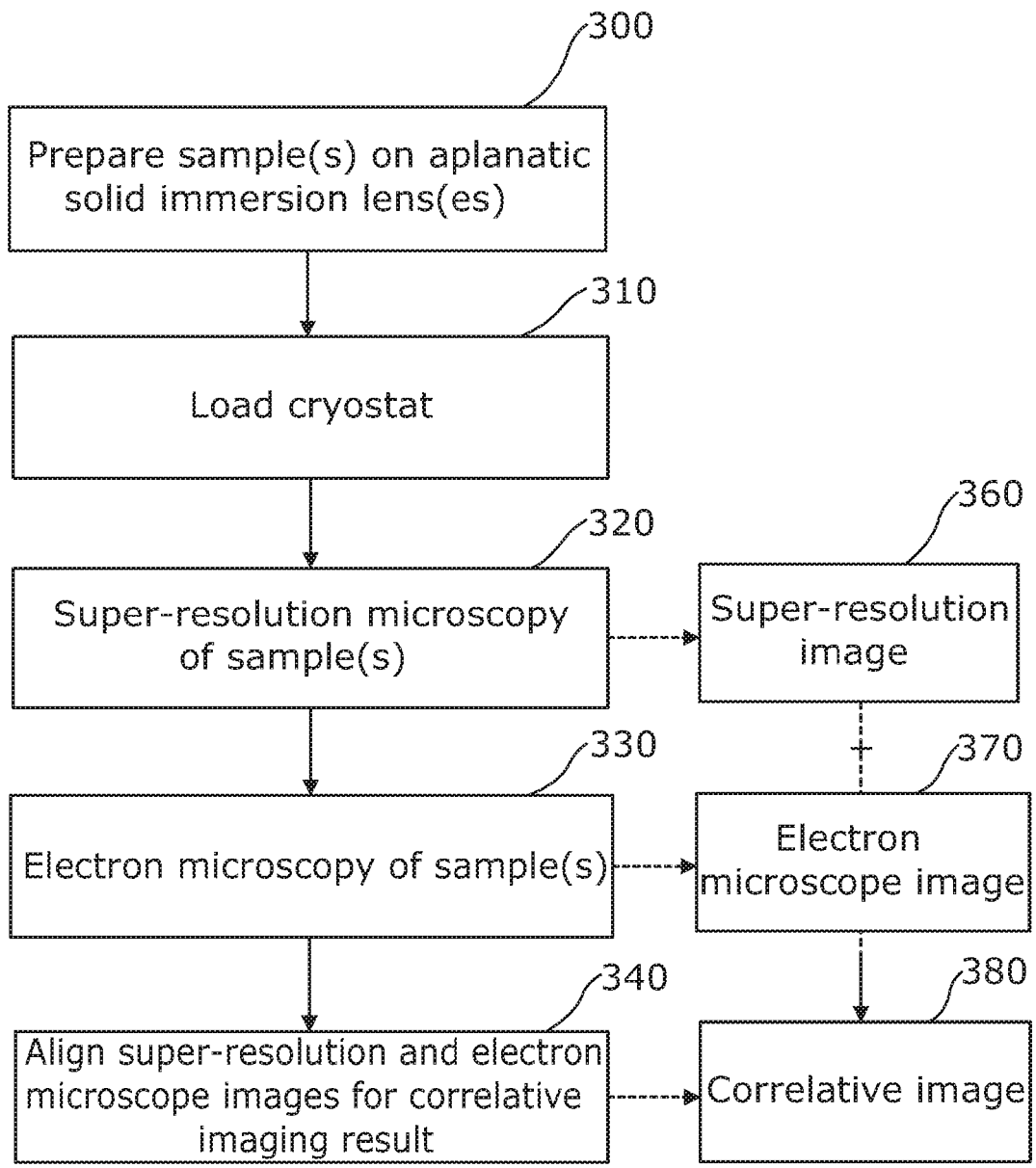
FIG. 7 provides a flow chart of methods for correlative imaging using the lens assembly.

In step 300 of FIG. 7 a sample is prepared, for example as discussed in more detail elsewhere in this document, in contact or immediately adjacent to the planar face 12 of a solid immersion lens 14, for example an ASIL, included in a lens assembly 10 as described above. The lens assembly may then be loaded into a suitable cryostat for maintaining the sample within a cryogenic environment 42.

The sample is then subject to a cryogenic super-resolution microscopy technique as described elsewhere in this document in order to obtain super-resolution image data 360 of the sample.

Having obtained the super-resolution image data 360, the sample is then subject to an electron microscopy technique in step 330 of FIG. 7 in order to obtain electron microscopy image data 370 of the sample. Conveniently, having prepared the sample to be in contact with or adjacent to the solid immersion lens used for the super-resolution microscopy step 320, the solid immersion lens and lens assembly can continue to act as a support for the sample during the electron microscopy step 330, without significant disturbance of the samples. If the lens assembly is within a cryostat during the super-resolution microscopy process, then the lens assembly may remain in place in the same cryostat for transfer to and use within the electron microscope arrangement.

The electron microscope arrangement may provide various different types of electron microscopy for imaging the sample such as scanning electron microscope (SEM) and transmission electron microscope (TEM) arrangements. For some such techniques, further preparation of the sample may be appropriate before the super-resolution microscopy step 320 and before the electron microscopy step 330. If required, the super-resolution microscopy and electron microscopy stages of FIG. 7 may be reversed, and/or other microscopy stages, for example including other imaging stages of the same or different microscopy, super-resolution microscopy, and electron microscopy techniques. X-ray microscopy techniques such as a soft X-ray microscopy technique may be used as well as or instead of an electron microscopy technique.

Having obtained super-resolution image data 360 and electron microscopy image data 370 of the same sample, the image data pair may be aligned or correlated, for example, using fiducial markers or feature detection algorithms, such that structural features in the sample are coincident. Such alignment may then be used, if required, to combine the super-resolution image data 360 and electron or X-ray microscopy image data 370 to form a combined or correlative image 380 of the sample.

Such a combined or correlative image 380 of the sample may provide significant benefits over either of the super-microscopy image 360 or the electron or X-ray-microscopy image considered separately. For example, correlative light and electron or X-ray microscopy offers a multi-modality imaging solution of molecular distribution and organisation of specific biomolecules in the context of cellular ultrastructure.

By providing a lens assembly which is more suitable for use in both a super resolution optical microscope arrangement and an electron microscope arrangement, and which is constructed to be robust at cryogenic temperatures, such correlative imaging can be made more reliable and convenient.

Although particular embodiments of the invention have been described, the skilled person will appreciate that various modifications and variations may be made without departing from the scope of the invention.

For example, as well as single molecule localisation microscopy, other established super-resolution microscopy techniques, such as structured illumination microscopy, stimulated emission depletion (STED) microscopy, super-resolution radial fluctuations (SRRF) techniques, super-resolution optical fluctuation imaging (SOFI), and reversible saturable optical linear fluorescence transitions (RESOLFT) techniques, can also implemented using the described apparatus and methods.

The invention claimed is:

1. A lens assembly for use in microscopy imaging of a sample in a cryogenic environment, the lens assembly comprising:
   a planar mount comprising an aperture through a plane of the mount; and
   a solid immersion lens having an equatorial region and comprising a planar surface for accepting the sample for imaging,
   the solid immersion lens being mounted within the aperture,
   wherein the aperture comprises a circumferential channel between the planar mount and the solid immersion lens, the planar mount comprises a plurality of nibs extending into the circumferential channel towards the solid immersion lens, and the equatorial region of the solid immersion lens is secured within the circumferential channel of the aperture; and
   wherein the solid immersion lens is secured within the aperture using adhesive material.

2. The lens assembly of claim 1 wherein the solid immersion lens is an aplanatic solid immersion lens, ASIL.

3. The lens assembly of claim 1 wherein the planar surface of the lens is parallel to the plane of the mount.

4. The lens assembly of claim 1 wherein the solid immersion lens extends from the aperture in both directions away from the plane of the mount.

5. The lens assembly of claim 1, wherein the adhesive material is located within the circumferential channel, the adhesive material bridging between the planar mount and the solid immersion lens.

6. The lens assembly of claim 5 wherein the adhesive material extends continuously around the circumferential channel.

7. The lens assembly of claim 1 wherein an equatorial cross section through the solid immersion lens is circular and the aperture is circular.

8. The lens assembly of claim 1 wherein the mount is formed of at least one of: a metal, platinum, a ceramic, and a semiconductor.

9. The lens assembly of claim 1 wherein each of the plurality of nibs extending into the circumferential channel touch the solid immersion lens.

10. The lens assembly of claim 1 wherein a circumference of the planar mount is circular.

11. The lens assembly of claim 1 wherein each nib has a base which extends for no more than 5% around a periphery of the aperture.

12. The lens assembly of claim 1 wherein the solid immersion lens is secured within the aperture using first adhesive material placed at each of the nibs to secure the solid immersion lens to the planar mount at the nibs.

13. The lens assembly of claim 12 wherein the solid immersion lens is further secured within the aperture using second adhesive material at each of the nibs, wherein the first adhesive material has a shorter curing time than the second adhesive material.

14. The lens assembly of claim 12 wherein the solid immersion lens is further secured within the aperture using third adhesive material disposed along a length of the circumferential channel.

15. The lens assembly of claim 1 further comprising:
a sample on or adjacent to the planar surface of the solid immersion lens;
a cryogenic environment in which the sample is located; and
a super-resolution optical microscope arranged to obtain a super-resolution optical image of the sample through the solid immersion lens.

16. The apparatus of claim 1 wherein the cryogenic environment is at least one of:
a temperature of less than 200 Kelvin; a temperature of less than 133 Kelvin; a temperature of less than 100 Kelvin; a temperature of less than 77 Kelvin; maintained using liquid nitrogen; and maintained using nitrogen vapour.

17. A method of mounting a solid immersion lens for use in microscopy imaging of a sample in a cryogenic environment, the method comprising:
providing the solid immersion lens, the solid immersion lens having an equatorial region, and having a planar surface for accepting the sample for microscopy imaging;
providing a planar mount comprising an aperture through a plane of the mount and a plurality of nibs; and
mounting the solid immersion lens within the aperture such that a circumferential channel separates the solid immersion lens and the planar mount, the plurality of nibs extend into the circumferential channel towards the solid immersion lens, the equatorial region of the solid immersion lens is secured within the circumferential channel, and the solid immersion lens extends from the aperture in both directions away from the plane of the mount; and
wherein:
the step of mounting comprises a subsequent step of securing the solid immersion lens within the aperture using adhesive material, the step of securing comprising:
a step of placing first adhesive material at each of the nibs to secure the solid immersion lens to the planar mount at the nibs and allowing the first adhesive material to cure; and
a subsequent step of placing third adhesive material along a length of the circumferential channel and allowing the third adhesive to cure.

18. The method of claim 17 wherein the step of securing comprises, prior to the step of placing the third adhesive material and after the step of placing the first adhesive material, a step of placing second adhesive material at each of the nibs to further secure the solid immersion lens to the planar mount at the nibs and allowing the second adhesive material to cure, wherein the first adhesive material has a shorter curing time than the second adhesive material.

19. The method of claim 17 wherein the step of placing third adhesive material along a length of the circumferential channel and allowing the third adhesive to cure comprises placing the third adhesive material along a full length of the circumferential channel and allowing the third adhesive to cure.

20. The method of claim 17 further comprising:
providing a jig having a first linear channel formed in an upper surface of the jig, and a second linear channel parallel to the first linear channel and formed in a floor of the first linear channel;
locating the planar mount in the first linear channel; and
prior to mounting the solid immersion lens within the aperture, locating the solid immersion lens in the second linear channel such that the solid immersion lens is located within the aperture through the plane of the mount.

21. The method of claim 20 wherein the jig is provided with a rebate formed in the floor of the first linear channel along each boundary between the first and second linear channels.

22. The method of claim 17, further comprising:
locating the sample on or adjacent to the planar surface of the solid immersion lens;
locating the sample in a cryogenic environment; and
imaging the sample through the solid immersion lens using a super-resolution optical microscopy technique to provide a super-resolution image of the sample.

23. The method of claim 22 wherein the super-resolution optical microscopy technique is a single molecule localisation optical microscopy technique.

24. The method of claim 22 further comprising:
carrying out electron microscopy or X-ray microscopy on the sample to provide a further image of the sample; and
correlating the super-resolution optical image and the further image of each sample to provide a correlative image of the sample.

25. The method of claim 13 wherein the cryogenic environment is at least one of:
a temperature of less than 200 Kelvin; a temperature of less than 133 Kelvin; a temperature of less than 100 Kelvin; a temperature of less than 77 Kelvin; maintained using liquid nitrogen; and maintained using nitrogen vapour.

* * * * *